United States Patent [19]
Thowe et al.

[11] Patent Number: 6,052,804
[45] Date of Patent: Apr. 18, 2000

[54] DATA TRANSFER OPTIMIZATION THROUGH SECTOR EVALUATION AND REALLOCATION DURING A DISC DRIVE IDLE MODE

[75] Inventors: Merle E. Thowe, Yukon; Mark A. Heath, Oklahoma City, both of Okla.

[73] Assignee: Seagate Technology, Inc., Scotts Valley, Calif.

[21] Appl. No.: 08/866,287

[22] Filed: May 30, 1997

Related U.S. Application Data

[60] Provisional application No. 60/035,010, Jan. 15, 1997.

[51] Int. Cl.[7] ................................................. G06F 11/00
[52] U.S. Cl. ........................... 714/710; 714/1; 714/2; 714/6; 714/25
[58] Field of Search ....................... 714/1–6, 710, 714/769, 765

[56] References Cited

U.S. PATENT DOCUMENTS

| | | | |
|---|---|---|---|
| 5,136,439 | 8/1992 | Weispfenning et al. | 360/77.08 |
| 5,262,907 | 11/1993 | Duffy et al. | 360/77.05 |
| 5,276,662 | 1/1994 | Shaver, Jr. et al. | 369/32 |
| 5,392,290 | 2/1995 | Brown et al. | 395/182.04 |
| 5,422,760 | 6/1995 | Abbott et al. | 360/46 |
| 5,459,757 | 10/1995 | Minuhin et al. | 375/376 |
| 5,592,340 | 1/1997 | Minuhin et al. | 360/46 |
| 5,627,843 | 5/1997 | Deng et al. | 371/37.12 |
| 5,631,999 | 5/1997 | Dinsmore | 388/805 |
| 5,701,304 | 12/1997 | Glover et al. | 371/10.2 |
| 5,721,816 | 2/1998 | Kusbel et al. | 395/182.13 |
| 5,751,733 | 5/1998 | Glover | 371/40.3 |

OTHER PUBLICATIONS

Finch and Moczarny, "Headerless disc formatting: Making room for more data," Data Storage Magazine, Apr. 1997, pp. 51, 52, and 54, vol. 4, No. 5, Pennwell Publishing Co., Tulsa, Oklahoma.

*Primary Examiner*—Meng-Ai T. An
*Assistant Examiner*—Nabil El-Hady
*Attorney, Agent, or Firm*—Crowe & Dunlevy

[57] ABSTRACT

An apparatus and associated method are disclosed for optimizing the data transfer performance of a disc drive in which user data is stored in data blocks arranged on tracks of at least one rotating disc. When a selected, uninterrupted amount of time passes since the most recently performed disc drive operation, the disc drive enters an idle mode and selectively evaluates the data blocks for uncorrected read errors. During the idle mode, at such time that a selected data block is found having an uncorrected error, a sequence of corrective operations are performed in an attempt to resolve the error and the selected data block is reallocated when at least selected one of the corrective actions are unsuccessful.

11 Claims, 4 Drawing Sheets

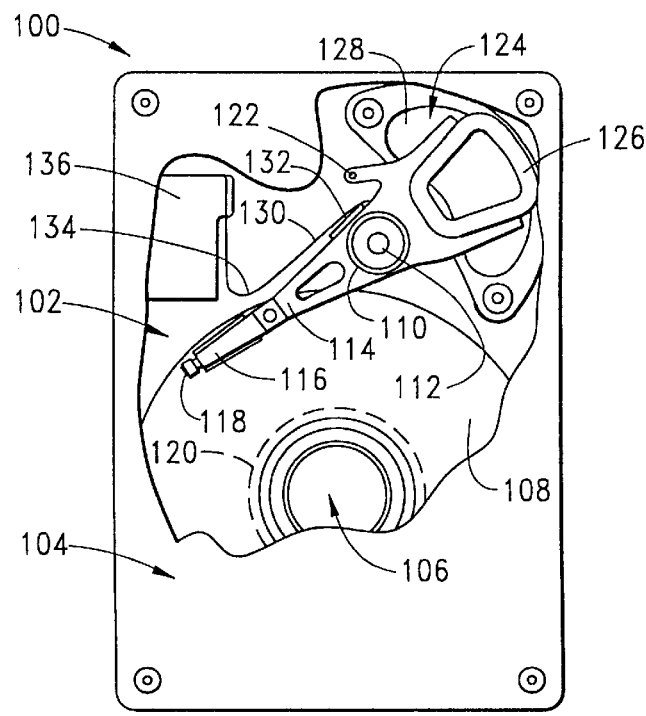
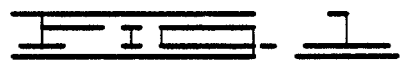
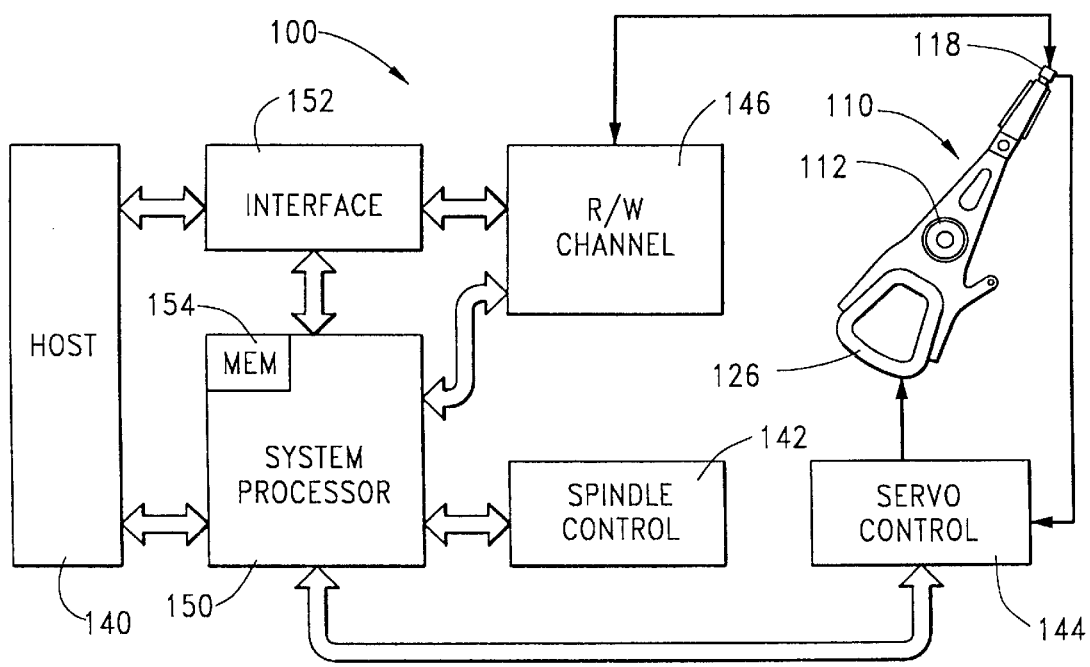
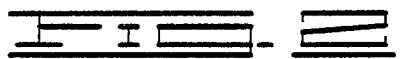

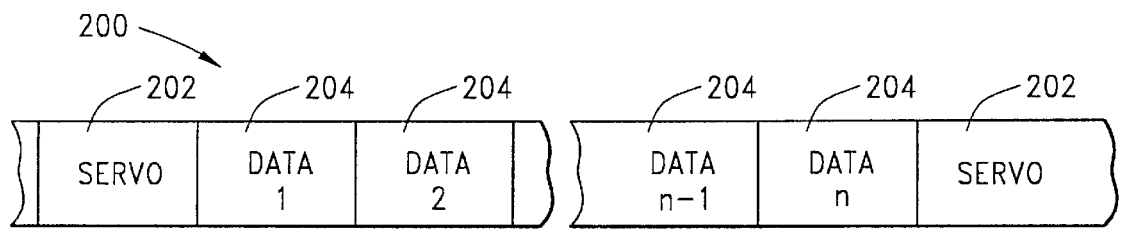
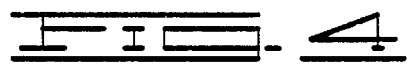
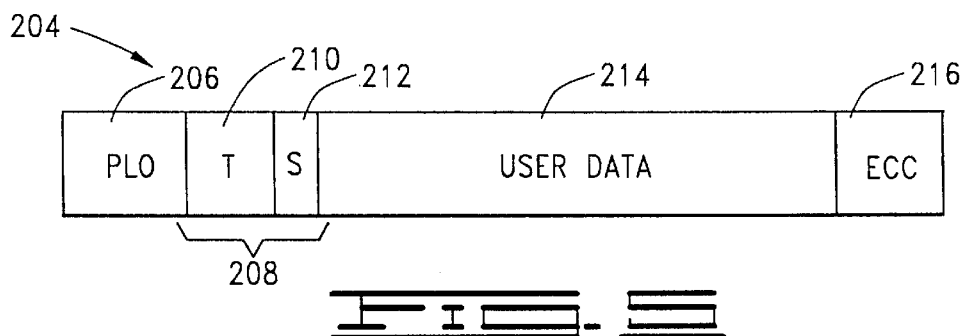
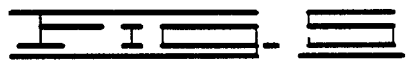
| 1 | HOLD THRESHOLDS |
|---|---|
| 2 | ADAPT CHANNEL |
| 3 | CHANGE ECC LEVEL |
| 4 | POSITION OFF-TRACK |
| 5 | SEEK AWAY |
| 6 | REREAD |
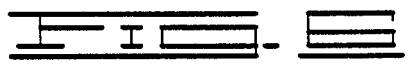

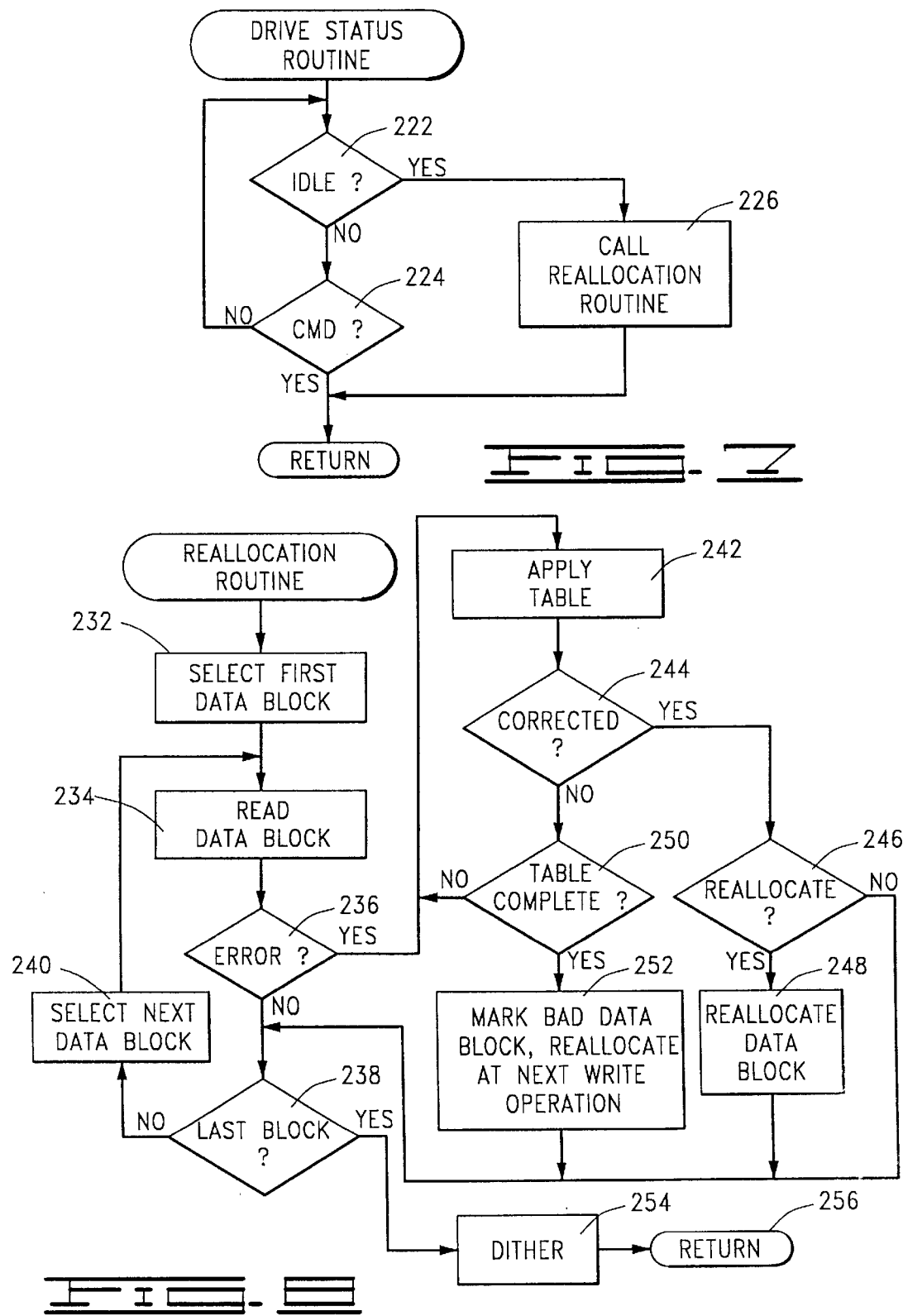

DATA TRANSFER OPTIMIZATION THROUGH SECTOR EVALUATION AND REALLOCATION DURING A DISC DRIVE IDLE MODE

CROSS-REFERENCE TO RELATED APPLICATION

This application claims priority to U.S. Provisional Application Ser. No. 60/035,010 filed Jan. 15, 1997.

FIELD OF THE INVENTION

The present invention relates generally to the field of disc drive devices and more particularly, but without limitation, to optimizing the data transfer rate of a disc drive through the reallocation of bad sectors during idle modes of operation.

BACKGROUND

Data storage devices of the type known as "Winchester" or "hard" disc drives are typically provided with a plurality of rigid discs that are coated with a magnetizable medium and mounted on the hub of a spindle motor for rotation at a constant high speed. A controllably positionable actuator is disposed adjacent the discs, the actuator including a plurality of heads which are used during write and read operations to store and retrieve user data from tracks defined on the disc surfaces.

A closed loop servo system is used to control the position of the heads with respect to the tracks on the disc. More particularly, the actuator typically includes a coil of a voice coil motor (VCM) such that currents applied to the coil by the servo system cause the heads to move relative to the tracks in a controlled manner. A read/write channel, responsive to the heads, controls the transfer of user data between the discs and a host computer in which the disc drive is mounted.

As will be recognized, typical disc drives utilize various techniques to minimize the effects of anomalous conditions upon the transfer of the user data between the discs and the host computer. For example, typical read/write channels employ various types of filtering and signal level detection to account for channel noise that would tend to interfere with the reliable transmission of the user data. Further immunity to various anomalous conditions is achieved through the use of error detection and correction codes and associated circuitry for encoding and subsequently decoding the bits transferred to and from the discs. Moreover, typical servo systems use threshold detection and other well known techniques to filter out invalid head position and velocity information in order to prevent unnecessary and time consuming head position corrections.

Nevertheless, anomalous conditions can arise during the life of a disc drive which tend to decrease the overall data transfer performance of the drive. Highly sensitive magneto-resistive (MR) heads, which detect the selective magnetization of tracks through corresponding changes in resistance of MR elements of the heads, are particularly susceptible to anomalous conditions commonly referred to as "thermal asperities". Broadly speaking, a thermal asperity comprises a rapid change in the temperature and/or heat dissipative state of an MR head as a result of the physical interaction between the head and the surface of a disc. Particularly, a contact thermal asperity involves the MR head physically contacting a localized "hill" on the surface of the disc (or a particulate disposed on the disc); the kinetic energy from the impact can cause read channel distortion for several microseconds, sufficient to prevent recovery of up to 100 bytes or more of information on the disc, depending on the transfer rate and filtering characteristics of the channel. A non-contact thermal asperity occurs as the heat dissipative characteristics of a head rapidly change as the head passes over, but does not contact, a localized "hill" or "valley" on the disc surface; while non-contact thermal asperities adversely affect the data transfer capabilities of a disc drive to a lesser extent than do contact thermal asperities, non-contact thermal asperities can still distort the read channel for several hundred nanoseconds, potentially affecting tens of bytes of information. Significantly, thermal asperities can "grow" over time so that typical disc drives can generally be expected to experience increasingly greater amounts of read channel and servo system errors as a result of thermal asperities. Other anomalous conditions stemming from such causes as, for example contamination and wear, have also been found to generally decrease disc drive data transfer characteristics over time.

A read error is typically declared at such time that user data retrieved from a data block, or sector, of a track contains one or more uncorrectable errors. It will be recognized that a typical disc drive includes internally programmed error recovery routines so that, in the face of such an error, the disc drive proceeds to apply a variety of corrective operations in order to recover the user data. The use of such corrective operations will limit the maximum data transfer rate of the disc drive, especially as certain types of corrective operations can require a relatively significant amount of time to complete. Occasionally, having exhausted all available avenues for data recovery without success, the disc drive will declare a hard error and reallocate the data block by mapping out the bad data block and substituting therefor a new, unused data block from a different physical location in the drive.

It will be readily apparent that users increasingly rely on the ability of disc drives to efficiently store and retrieve user data. Thus, persistent read and servo errors not only reduce the effective data transfer rate of a drive, but when sufficiently severe, can unhappily prevent the retrieval of data that was previously stored to the discs of the drive.

Accordingly, it is becoming increasingly important that modem computer systems be provided with efficient and reliable data storage and retrieval characteristics. There is a continuing need, therefore, for improvements in the art whereby the effects of anomalous conditions upon the operational performance of disc drives can be minimized.

SUMMARY OF THE INVENTION

The present invention provides a method and apparatus for optimizing the data transfer performance of a disc drive.

In accordance with the preferred embodiment of the present invention, the disc drive stores data in data blocks arranged on tracks of one or more rotating discs. During an idle mode of operation which is detected through the passage of a selected, uninterrupted amount of time since the most recently performed disc drive operation, the disc drive enters a reallocation routine during which the data blocks are sequentially evaluated for the presence of uncorrected read errors.

At such time that a selected data block is found having an uncorrected error, a sequence of corrective operations are performed in an attempt to resolve the error. The corrective operations are preferably stored in a table and performed in a sequence determined by the order in which the corrective operations appear in the table.

Should the error condition be determined as being sufficiently severe so that extended amounts of effort are required to recover the data from the selected data block, the disc drive further proceeds to reallocate the selected data block by writing the recovered data to another data block at a different physical location in the disc drive and transferring the old logical address to the new data block. Accordingly, most of the reallocation of marginal data blocks will be transparent to the user.

It will be noted that during early portions of the operational life of the disc drive, generally fewer data blocks will have been accessed by a user to store data as compared later portions of the operational life of the disc drive. Thus, the disc drive advantageously operates to evaluate and remove from future use marginal data blocks that have yet to be accessed by the user.

Finally, although uncorrected read errors are used as primary reallocation criteria in accordance with the preferred embodiment, other types of errors, such as sync errors and servo information errors, can also be utilized as reallocation criteria.

These and various other features and advantages which characterize the present invention will be apparent from a reading of the following detailed description and a review of the associated drawings.

BRIEF DESCRIPTION OF THE DRAWINGS

FIG. 1 is a disc drive constructed in accordance with the preferred embodiment of the present invention.

FIG. 2 provides a functional block diagram of the disc drive of FIG. 1 operably connected to a host computer in which the disc drive is mounted.

FIG. 4 is a simplified representation of a portion of a track of the disc drive of FIG. 1, showing the relative placement of servo and data blocks on the track.

FIG. 5 provides a detailed representation of one of the data blocks of FIG. 4.

FIG. 6 is a table of typical corrective operations that can advantageously be performed in accordance with the preferred embodiment of the present invention.

FIG. 7 provides a generalized flow chart of a top-level DRIVE STATUS routine representative of programming used by the system processor of FIG. 2 in accordance with the preferred embodiment of the present invention.

FIG. 8 provides a generalized flow chart of a REALLOCATION routine performed in conjunction with the routine of FIG. 7, the routine of FIG. 8 representative of programming used by the system processor of FIG. 2 in accordance with the preferred embodiment of the present invention.

DETAILED DESCRIPTION

Figure 3:
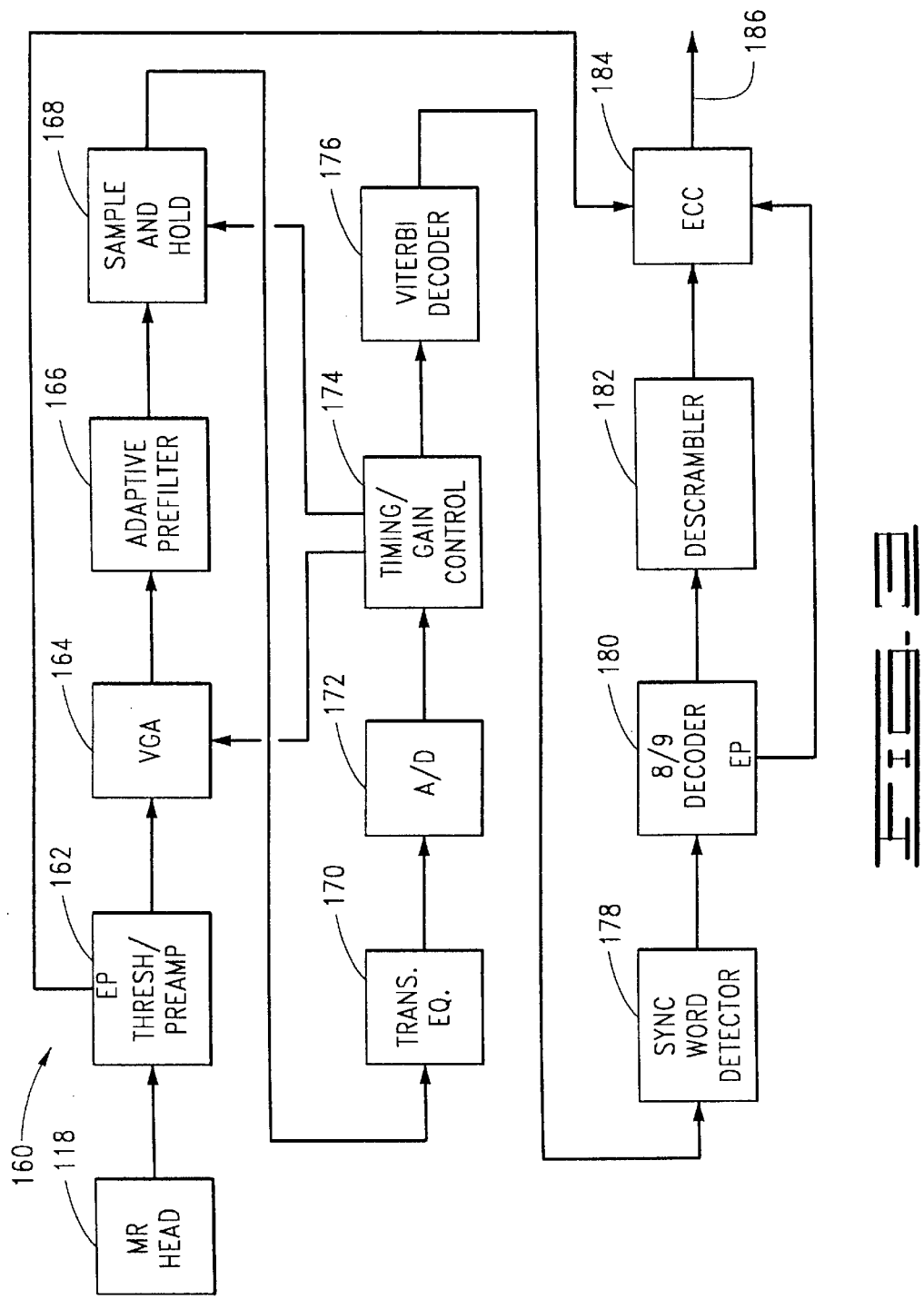
FIG. 3 provides a functional block diagram of the read channel portion of the read/write channel shown in FIG. 2.

In order to set forth the preferred embodiment of the present invention, it will be helpful to first briefly describe the construction and operation of a disc drive in which the present invention is advantageously implemented. Turning now to the drawings and more particularly to FIG. 1, shown therein is a top plan view of a disc drive 100 comprising a base deck 102 to which various disc drive components are mounted and a top cover 104, which is shown in a partial cutaway fashion to expose selected components of interest. Although not explicitly illustrated in the top plan view of FIG. 1, it will be readily understood that the base deck 102 cooperates with the top cover 104 to provide an internal, sealed environment for the disc drive 100.

Mounted to the base deck 102 is a spindle motor (shown generally at 106) to which a plurality of discs 108 are mounted for rotation at a constant high speed. Adjacent the discs 108 is an actuator assembly 110 which pivots about a cartridge bearing assembly 112 in a rotary fashion. The actuator assembly 110 includes actuator arms 114 which support flexures 116. The flexures 116 in turn support heads 118, with each of the heads 118 corresponding to a surface of one of the discs 108. As provided hereinabove, the heads 118 are positionably located over data tracks (not shown) of the discs 108 in order to read data from and write data to the tracks. At such time that the disc drive 100 is not in use, the heads 118 are moved to landing zones (denoted at broken line 120), which are located in FIG. 1 near the inner diameter of the discs 108. A latching arrangement (a pin of which is shown at 122) is used to secure the actuator assembly 110 when the heads 118 are moved to the landing zones 120.

Continuing with FIG. 1, the actuator assembly 110 is controllably positioned by way of a voice coil motor (VCM, shown generally at 124) comprising an actuator coil 126 immersed in the magnetic field generated by at least one permanent magnet 128. When current is passed through the actuator coil 126, an electromagnetic field is set up therein which interacts with the magnetic circuit of the VCM 124, causing the actuator assembly 110 to pivot about the cartridge bearing assembly 112 and the heads 118 to move across the surfaces of the discs.

To provide the requisite electrical conduction paths between the heads 118 and disc drive read/write circuitry (not shown in FIG. 1), head wires (not separately shown) are routed on the actuator assembly 110 from the heads 118, along the flexures 116 and the actuator arms 114 to a flex circuit assembly 130. Particularly, the head wires are secured to corresponding pads of a flex circuit board 132 which is connected to a flex 134 which terminates at a flex circuit bracket 136. Thus, the flex circuit assembly 130 facilitates communication between the actuator assembly 110 and a printed circuit board (PCB) mounted to the underside of the disc drive 100 (the PCB is not shown in FIG. 1). As will be recognized, the PCB houses the control electronics for the disc drive 100.

FIG. 2 provides a general functional block diagram of the disc drive 100 of FIG. 1 mounted in a host computer 140. As shown in FIG. 2, the disc drive 100 generally comprises a spindle control circuit 142, a servo control circuit 144 and a read/write channel 146, all operably connected to a system processor 150. It will be recognized that the system processor 150 communicates with and controls the operation of these circuits in a known manner, with the exceptions as discussed below. Additionally, an interface circuit 152 is shown connected to the read/write channel 146 and to the system microprocessor 150, with the interface circuit 152 serving as a conventional data interface and buffer for the disc drive. The interface circuit 152 includes a sequencer (not separately shown) which comprises hardware used to establish varying timing sequences during the operation of the read/write channel 146.

As will be recognized, the spindle control circuit 142 controls the rotational speed of the spindle motor 106 (FIG. 1) in a conventional manner. For additional discussion regarding spindle control circuits, see U.S. Pat. No. 5,631,999 issued May 20, 1997 to Dinsmore, assigned to the assignee of the present invention.

The servo control circuit 144 of FIG. 2 is shown to receive servo position information from the head 118 and, in response thereto, provides a correction signal to the actuator coil 126 in order to position the head 118 with respect to the disc 108 (FIG. 1). A dedicated servo system generally entails the use of at least one surface of the discs 108 as a dedicated servo surface, from which the alignment of the remaining heads relative to the corresponding disc surfaces can be achieved; alternatively, an embedded servo system entails the storage of both servo information and user data on each track on each of the surfaces of the discs. Although the disc drive 100 is contemplated as utilizing an embedded servo system, so that both user data and servo information are stored on each of the tracks, it will be readily understood that the present invention is not so limited. For additional discussion regarding typical digital servo systems such as the servo control circuit 144, see U.S. Pat. No. 5,262,907 issued Nov. 16, 1993 to Duffy et al., as well as U.S. Pat. No. 5,136,439 issued Aug. 4, 1992 to Weispfenning et al., both of these references being assigned to the assignee of the present invention.

The read/write channel 146 operates to write data to the disc 108 in response to user data provided to the channel from the interface circuit 152 by encoding and serializing the data and generating a write current utilized by the head 118 to selectively magnetize portions of a selected track on the disc 108. Correspondingly, the previously stored data is retrieved by the read/write channel 146 by reconstructing the data from the read signals generated by the head 118 as the head passes over the selected track on the disc 108. The operation of the read/write channel 146 in accordance with the preferred embodiments of the present invention will be discussed in greater detail below.

Finally, it will be noted that the various operations of the disc drive 100 are controlled by the system microprocessor 150, in accordance with programming stored in system microprocessor memory (MEM) 154.

Referring now to FIG. 3, shown therein is a functional block diagram of a read channel 160 of the disc drive 100, the read channel 160 constituting the readback portion of the read/write channel 146 of FIG. 2. It will be recognized that additional components and features may typically be provided in the read channel 160 and further, selected operations of several of the components disclosed in FIG. 3 are controlled with inputs provided from, for example, the system processor 150 and the interface circuit 152 of FIG. 2; however, the read channel 160 of FIG. 3 is sufficiently detailed, in conjunction with the following description, to readily facilitate a thorough understanding of the present invention.

The read channel 160 employs partial response, maximum likelihood (PRML) signal processing, which as will be recognized involves time-domain equalization and self-synchronization of the read signal provided by the head 118. Particularly, time-domain equalization is used to reshape a readback signal received by the channel to an approximation of a desired target waveform in the time domain, such as used in PRML class PR-4 detection. Reshaping the readback signal allows intersymbol interference (ISI) to be reduced and controlled, facilitating reliable sequential decoding of the digital information stored on the disc. Such time-domain equalization is typically implemented through the use of a transversal equalizer/filter circuit (sometimes also commonly referred to as a "finite impulse response" circuit, or "FIR"). Moreover, self-synchronization involves synchronization of the rate of data recovery with the rate of incoming readback signals, which varies as a result of the speed of the rotating disc and the radial position of the associated head. Typically, such self-synchronization is achieved through the use of a phase locked loop (PLL) which generates clock signals for the sampling of equalized signals at appropriate moments and for the subsequent recovery of the stored data from the samples by way of a Viterbi decoder. Practical PRML read channel implementations are discussed, for example, in U.S. Pat. No. 5,422,760, issued Jun. 6, 1995 to Abbott et al. (digital equalizer, timing and decoder circuitry), U.S. Pat. No. 5,459,757 issued Oct. 17, 1995 to Minuhin et al. (analog timing and decoder circuitry) and U.S. Pat. No. 5,592,340 issued Jan. 7, 1997 to Minuhin et al. (analog equalizer circuitry). It will be readily understood, however, that although the present invention is particularly suited to a channel employing PRML signal processing, the present invention is not so limited.

Continuing with FIG. 3, the read channel 160 is shown to comprise a threshold detector and preamp circuit 162 (hereinafter also referred to as "preamp") which operates to monitor the variations in the read voltage sensed across the MR element of the head 118, which is identified in FIG. 3 as an MR head. The preamp 162 provides threshold detection, preamplification and frequency domain filtering of the signal provided by the head 118.

More particularly, the preamp 162 monitors the variations in magnitude of voltage across the MR element of the head 118 and provides indications when the voltage exceeds a predetermined threshold bounding the nominal read voltage. Such detection is useful, for example, in detecting the occurrence of a thermal asperity. Thus, the preamp 162 utilizes a predetermined signal level threshold for the read voltage and provides indications when the threshold has been exceeded.

Additionally, the preamp 162 provides preamplification of the read signal from the head 118 to a level sufficient for processing by the remainder of the read channel 160. As discussed above, it is common to locate the preamp 162 on the flex circuit board 132 (FIG. 1) as it is typically desirable to place the circuit as close as possible to the heads 118.

The preamp 162 further includes a high pass frequency domain filtering stage. Such filtering reduces the effective duration of a thermal asperity by removing a significant amount of the energy in the read signal attributable to the thermal asperity event. More particularly, by choosing a suitable cutoff frequency the duration of a typical thermal asperity can be reduced from about 2 to 5 microseconds down to about 300 to 500 nanoseconds. For a data transfer rate of 200 megabits per second (Mbits/sec), this results in a reduction in the number of affected bytes from 50–125 bytes down to about 8–13 bytes, which is well within the error correction capability of the read channel 160, as discussed below.

The cutoff frequency will be selected based upon the requirements of a particular read channel application, but for purposes of illustration a typical value can be around 6 megahertz (MHz). It also may be desirable to use a different cutoff frequency value for different zones in a disc drive employing the use of zone bit recording (ZBR). It is further contemplated that the high pass frequency domain filtering will be performed at such times that the read channel 160 is enabled. Finally, the high pass frequency domain filtering stage can be located elsewhere in the read channel 160 depending upon the requirements of a given application, but preferably comes before a variable gain amplifier (VGA) 164, as shown in FIG. 3.

Particularly, the filtered output signal from the preamp 162 is provided to the VGA 164, which typically includes automatic gain control (AGC) to maintain a nominal signal amplitude for the remainder of the read channel 160. Additionally, the VGA 164 can be set to a fixed gain, useful during certain types of error recovery operations.

The amplified signal is then prefiltered by an adaptive prefilter 166 which generally operates as a low pass filter to remove higher frequency noise components from the signal. The frequency domain filtering characteristics of the adaptive prefilter 166 can be readily controlled through the use of control inputs (not shown) provided by, for example, the system processor 150.

The filtered output of the adaptive prefilter 166 is provided to a sample and hold circuit 168, which as will be recognized provides a series of discrete analog values in response to the input signal received by the circuit. These discrete analog values are then provided to a transversal equalizer 170, which as discussed above provides time domain equalization of the readback signal, filtering the signal to a close approximation of a selected class of PRML signaling (in this case PR-4).

The output of the transversal equalizer 170 is sampled (digitized) by an analog to digital (A/D) converter 172, and these samples are used by a timing and gain control circuit 174 to adjust the gain of the VGA 164. The timing and gain control circuit 174 further provides timing inputs to the sample and hold circuit 168 and a phase-locked loop (not separately shown) used by a Viterbi decoder 176 to decode read data from the samples obtained from the transversal equalizer 170.

The output from the Viterbi decoder 176 will comprise a digitally expressed data sequence corresponding to the encoded data originally written to the selected track. This output data sequence is provided to a sync word detector 178 which, when enabled by the sequencer of the interface circuit 152, proceeds to examine each successive set of bits in the output data sequence, searching for a unique pattern which enables the read channel 160 to synchronize with the user data. This unique pattern, or sync word, provides an indication that the following bits in the sequence are user data to be retrieved to the host.

After passing through the sync word detector 178, the data sequence is then provided to an 8/9 decoder 180, which converts each set of 9 bits stored to the disc 108 back to the original 8 bits of input data to remove the run-length limited (RLL) encoding used to ensure reliable timing during the read recovery process. Although 8/9 encoding has been disclosed, it will be understood that other encoding rates can readily be utilized, such as 16/17. The output from the 8/9 decoder 178, which is typically characterized as a series of n-bit words, or symbols, is provided to a descrambler 182, which performs a selected logical operation upon each symbol using a set of descrambling words (or "keys") that rotate through a known sequence.

The output sequence from the descrambler 182 is then provided to an error correction code (ECC) circuit 184, which performs error detection and correction upon the received sequence (using, for example Reed-Solomon codes) and, if no uncorrectable errors are present, outputs user data on signal path 186 to the interface circuit 152 (FIG. 2) for subsequent transfer to the host computer 140.

As discussed in greater detail in U.S. Pat. No. 5,627,843 issued May 6, 1997 to Deng et al. and U.S. Pat. No. 5,276,662 issued Jan. 4, 1994 to Shaver et al., both of which are assigned to the assignee of the present invention, ECC encoding is initially performed by the write channel portion of the read/write channel 146 by appending a number of code symbols to the end of each selected portion of data symbols to generate encoded words (or interleaves) that mathematically map into a Galois field. That is, the code symbols are added to the data symbols so that the total set of symbols can be considered to be the coefficients of a polynomial having defined roots, so that only mathematically defined combinations can legally exist. When an encoded word is retrieved, the word is compared to the set of defined combinations, so that encoded words containing read errors will generally not map into the set of defined combinations; thus, based upon the algorithm used by the ECC circuitry, illegal combinations can be detected and up to a selected number of the data symbols in such words can be changed in order to correct the presence of read errors therein. Once the data has been corrected, the code bits are stripped, allowing the originally recorded data to be output by the ECC circuit 184 to the interface circuit 152 and then on to the host computer 140. The ECC circuit is preferably implemented in hardware so that on-the-fly detection and correction can take place without the need for firmware intervention.

As will be recognized, different algorithms, or levels of ECC correction, can be used with the same encoding scheme to detect and correct different numbers of errors in the retrieved encoded words, or to provide different probabilities of detection and correction. Risks associated with ECC correction generally include both the erroneous correction of correct data and the non-detection of read errors in the retrieved data. Thus, an optimal level of ECC correction is typically chosen which balances the number of correctable errors, the probability of miscorrection of errors and the probability of misdetection of errors.

The ECC circuit 184 has the capability of correcting up to a maximum of t erroneous data symbols and 2t erasures, as is conventional in the art. As will be recognized, an erasure is an indication provided by selected circuits in the read channel 160 that a particular portion of the data stream has been corrupted, or otherwise includes errors. An example of an erasure pointer generator in the read channel 160 of FIG. 3 is the preamp 162, which indicates the occurrence of a thermal asperity as a result of the operation of the threshold detection portion of the circuit and provides an indication of the affected bytes to the ECC circuit 184. Another erasure pointer generator is the 8/9 decoder 180, which provides an indication to the ECC circuit 184 that a particular data symbol from the Viterbi decoder 176 contains an illegal combination of bits; a plurality of sequential illegal symbols would likely indicate the occurrence of a thermal asperity.

Thus, for a given set of symbols the ECC circuit 184 can correct up to v errors and u erasures, provided that:

$$u/2 + v \leq t \qquad (1).$$

As disc drives typically store 512 bytes of data per sector (data block) on the discs and typically employ Reed-Solomon encoding schemes using one code symbol for (up to) 255 bytes of data, each sector of data will typically have three to four code symbols for the data symbols stored in the sector. Accordingly, the ECC circuit 184 preferably can correct up to four errors in the data symbols associated with each code symbol (i.e., t=4) and can alternatively correct up to eight erasures in the data symbols for each code symbol (i.e., 2t=8). Hence, for a data block having four code words, up to 16 errors or up to 32 erasures can be corrected by the ECC circuit 184 in the user data stored in the sector, within the constraints of equation (1) above.

Having concluded an overview of the disc drive 100 with respect to FIGS. 1 through 3, the manner in which servo information and user data fields are organized on the disc drive 100 will now be discussed. Such discussion will facilitate a thorough understanding of the various aspects of the invention which will be subsequently presented.

Turning now to FIG. 4, shown therein is a portion of a track 200 on the disc 108 of FIGS. 1 and 2. The track 200 of FIG. 4 includes embedded servo blocks 202, which constitute servo information written to the track 200 by a servo track writer during manufacturing of the prior art disc drive.

The servo information of the servo blocks 202 is used by the servo control circuit 144 of FIG. 2 to control the position of the head 118 relative to the track 200. Additional discussion regarding typical formats for the servo blocks is provided, for example in the previously identified Duffy U.S. Pat. No. 5,262,907. Disposed between the servo blocks 202 are a total number of "n" data blocks 204, which generally define portions on the track 200 wherein user data supplied by the host computer 140 (FIG. 2) are stored. The servo and data blocks 202, 204 are also sometimes referred to as "servo fields" and "data fields", respectively.

FIG. 5 shows the general layout of one of the data blocks 204 of FIG. 4-1. As shown in FIG. 5, the data block 204 first includes a phase locked loop (PLO), or 2T field 206 which, when read, enables the read channel 160 (FIG. 3) to acquire the necessary timing and amplitude initialization information for the subsequent reading of the user data stored in the data block 204. Following the PLO field 206 is a service field 208, which is further subdivided as shown in FIG. 5 into a training field 210 (T) and a sync field 212 (S).

The training field 210 generally comprises a series of randomized data that enables the read channel to further optimize the tap weights used by the transversal equalizer 170 (FIG. 3). As will be recognized, the training field 210 is optional and is typically included in disc drives incorporating transversal equalizers that do not otherwise possess sufficient self-adaptation characteristics.

The sync field 212 provides timing information with regard to the user data, the user data being stored in a user data field 214 immediately following the sync field 212. Thus, as will be recognized, proper operation of the read channel in response to the pattern of the sync field 212 enables the read channel to obtain frame lock, so that the read channel is ready to begin receipt of the user data from the user data field 214 at the appropriate time. As is known in the art, any number of patterns can be utilized for the sync field 212, with patterns containing a larger sequence of bits providing improved sync detection, but at the price of a corresponding increase in required overhead (and resulting reduction in user data storage capability for the disc drive).

Finally, an ECC code field 216 is appended at the end of the user data field 214, the ECC code field 216 having the previously discussed code words used by the ECC circuitry 180 (FIG. 3) to perform error detection and correction upon the data symbols read from the user data field 214. As will be recognized, the PLO field 206 and the service field 208 are written by the head 118 during the same write operation that results in the writing of the user data and associated ECC code symbols to the user data and ECC code fields 214, 216, respectively.

Having concluded the discussion of the general format for the servo and data blocks 202, 204 of FIGS. 4 and 5, reference is now made to FIG. 6 which illustrates a table of conventional error recovery routines (or "corrective operations") which can be advantageously performed in an attempt to resolve uncorrected read errors in user data retrieved from the data block 204 of FIG. 5. It will be recognized that the routines in the table of FIG. 6 are merely illustrative in nature and that other suitable disc drive error recovery routines could readily be performed in accordance with the following discussion. The corrective operations of FIG. 6 are preferably realized in programming utilized by the system processor 150 (FIG. 2).

As shown in FIG. 6, the table preferably comprises an ordered sequence of six corrective operations, each with a corresponding table count, so that each of the corrective operations are performed in order until either the table is exhausted or the error is corrected. The first corrective operation is identified as HOLD THRESHOLDS, which involves the holding of various threshold parameters in the read channel 160 to preexisting values. Such parameters can include, for example, baseline thresholds of the preamp 162 and the gain of the VGA 164. Holding these values as indicated by the HOLD THRESHOLDS operation prevents such parameters that are otherwise self-adaptive to be undesirably adjusted by the occurrence of, for example, a thermal asperity. Moreover, depending upon the requirements of a particular application it is contemplated that the HOLD THRESHOLDS operation could readily comprise the adjustment of these parameters to known, predetermined values selected to provide optimal error recovery response by the read channel 160.

The table of FIG. 6 next provides an ADAPT READ CHANNEL operation, which in the preferred embodiment is contemplated as involving the adaptation of the tap weights used by the equalizer 170, although other parameters used by the read channel could readily be adapted, as desired, including the filtering characteristics of the adaptive prefilter 166. The manner in which such read channel adaptation can be accomplished is well understood by those skilled in the art and is discussed, for example, by the preceding Minuhin and Abbott references.

The third error recovery routine of FIG. 6 is identified as a CHANGE ECC LEVEL operation. As discussed above, the ECC circuitry 184 operates at a selected level of detection and correction for the particular code implementation (such as Reed-Solomon). Accordingly, a different level of error detection and correction can be specified in order to adjust the risks associated with the miscorrection and nondetection of read errors during the read error recovery operation in an attempt to improve performance of the read channel 160.

Next, the table of FIG. 6 identifies a POSITION OFF-TRACK operation, which comprises the movement of the head 118 away from the center of the associated track a selected percentage of the track width. As will be recognized, adjusting the head 118 so as to be off track center can result in the correction of read errors that occur from data not written exactly in the center of the track, or read errors that occur due to interference from the magnetization of adjacent tracks. Such off-track positioning is contemplated as being performed in directions both towards the inner and the outer diameters of the disc recording surface, up to a selected percentage of the track width (such as ±15%).

The next corrective operation in the table of FIG. 6 is identified as a SEEK AWAY operation, which comprises performing a one-track seek of the head 118 away from the selected track containing the data to an adjacent destination track, returning the head 118 to the selected track, and then performing a reread of the data when the sector containing the data passes under the head 118. As will be recognized, such seek away operations have been found to be effective in the elimination of read errors caused by misalignment of the head over the selected track as a result of a servo offset. Of course, the seek could be to a destination track other than a track adjacent to the selected track.

Finally, the last corrective operation shown in the table of FIG. 6 is identified as a REREAD operation, which comprises rereading the affected data block with no other changes in system parameters.

Referring now to FIG. 7, shown therein is a generalized flow chart illustrating a DRIVE STATUS routine utilized by the system microprocessor 150 in carrying out the preferred embodiment of the present invention. Particularly, the DRIVE STATUS routine of FIG. 7 optimizes the data transfer capabilities of the disc drive 100 by sequentially performing the corrective operations of FIG. 6 on the data blocks of the drive at such time that the drive enters an idle mode of operation. As explained in greater detail below, the routine farther reallocates those data blocks that are found to have unrecoverable errors (for reference, such blocks are commonly referred to as "bad data blocks" or "bad sectors"). It is contemplated that the routine of FIG. 7 will be implemented as a top level routine and will continuously run in conjunction with other conventional routines that are used by the system microprocessor 150 to control the operation of the disc drive 100.

FIG. 7 shows the IDLE COMPENSATION routine to begin at decision block 222, wherein the system microprocessor 150 determines whether the disc drive 100 is idle. An idle mode of operation involves a period of time wherein the disc drive 100 is not being utilized to transfer data between the discs 108 and the host computer 140; that is, the disc drive 100 is declared to be idle after a sufficient amount of time has passed since the most recent disc drive operation and the disc drive 100 is awaiting the receipt of a command from the host computer 140. In the preferred embodiment the disc drive 100 is determined to be idle after 500 milliseconds has passed without the receipt or issuance of a command by the system microprocessor 150.

Until such time that the disc drive 100 enters the idle mode of operation, the routine of FIG. 7 proceeds from the decision block 222 to a decision block 224, wherein the system microprocessor 150 determines whether a host command has been issued. As will be recognized, such a command will result in an interrupt that halts further execution of the routine while the system microprocessor 150 performs the issued command (or otherwise services the interrupt).

When the selected amount of time elapses so that an idle condition exists, the routine of FIG. 7 proceeds to call a REALLOCATION routine, as shown by block 236, which causes the system microprocessor 150 to execute the routine of FIG. 8. Although not explicitly indicated in FIG. 8, it will be recognized that the receipt of a command at any time during the execution of the REALLOCATION routine of FIG. 8 will cause the routine to exit at such point and the system microprocessor 150 will proceed to service the interrupt.

Turning now to FIG. 8, the routine is shown to begin at block 232, wherein the first data block 204 (FIG. 5) to be evaluated is selected. The operation of block 232 may include a seek so that the appropriate head 118 is moved to the particular track containing the first data block, as well as a latency period during which the disc drive 100 waits until the first data block reaches the head 118 as the disc 108 rotates under the head 118.

Once the first data block (204, FIG. 5) has been selected, the routine of FIG. 8 proceeds to perform a read operation upon the data block, as indicated by block 234, and then checks whether one or more uncorrected errors exists in the user data recovered from the data block, as indicated by decision block 236. If not, the routine continues to decision block 238, wherein the routine determines whether the block that was read by way of the operation of block 234 was the last data block to be evaluated; if not, the routine passes to block 240, wherein the next data block to be evaluated is selected and the routine passes back to block 234 as shown. The read operation of block 234 will thus be understood to encompass normal operation of the read channel 160 to retrieve the user data, including the on-the-fly detection and correction of errors by the ECC circuit 184. Hence, an uncorrected error will be detected when more read errors occur than can be corrected by the ECC circuit 184, or when the read channel 160 fails to properly detect the sync word so that no data transfer occurs.

At such time that a data block is found to have an uncorrected error, the flow of FIG. 8 passes from decision block 236 to block 242, wherein the table of recovery routines of FIG. 6 is applied to the data block in an effort to resolve the uncorrected read error. That is, block 242 causes the selection of the first routine, which as shown in FIG. 6 is the HOLD THRESHOLDS operation, so that the disc drive 100 rereads the data block while holding the read channel thresholds in a manner as described above. The routine then checks to see whether the error was corrected, as indicated by decision block 244; if so, the routine passes to decision block 246, which determines whether reallocation is warranted based upon the extent of the corrective actions taken to correct the error condition. As discussed below, the decision to reallocate is preferably made once a predetermined level of corrective actions from the table of FIG. 6 is reached. When the selected data block is determined as being sufficiently marginal to warrant reallocation, the flow passes from decision block 246 to block 248 wherein the selected data block is reallocated, which comprises the selection of a new, unused data block somewhere from within the disc drive, writing the data from the old data block to the new data block, marking the old data block as "bad" and transferring the logical address of the old data block to the new data block.

Should the level of corrective action taken to recover the data from the selected data block not warrant reallocation, however, the flow passes from decision block 246 to decision block 238, which operates in conjunction with block 240 as described above to select the next block for evaluation.

On the other hand, should the corrective operation from the table of block 242 fail to correct the error, the flow of FIG. 8 continues to decision block 250 which checks to see if all of the corrective operations from the table (FIG. 6) have been executed. If not, the routine passes back to block 242 wherein the next corrective operation in the table is selected and performed in an attempt to resolve the uncorrected read error.

At such time that all of the corrective operations of the table (FIG. 6) have been exhausted without resolution of the uncorrected error, the routine passes to block 252 wherein the bad data block is marked as unrecoverable so that, at the next write operation to the bad data block, the disc drive 100 will proceed to reallocate the bad data block by writing the data to a new unused data block and transferring the logical address of the bad data block to the new data block.

The routine of FIG. 8 thus continues in like manner to evaluate each of the data blocks of the disc drive 100 in turn, performing the corrective operations from the table of FIG. 6 for those data blocks having uncorrected errors as detected at decision block 236 and reallocating those data blocks which warrant reallocation. At such time that the last of the data blocks has been selected and evaluated by the routine, the flow passes from decision block 238 to block 254, wherein the disc drive 100 proceeds to perform a dithering operation during the remaining portions of the idle mode. As will be recognized, dithering generally comprises the periodic repositioning of the heads 118 with respect to the discs 108, so that the heads 118 do not remain over the discs 108 for more than a selected period of time before being repositioned. As indicated above, at such time that a command is received, the disc drive 100 will exit the idle mode as shown at RETURN block 256.

It will be noted that during the operation of the routine of FIG. 8, the disc drive 100 will preferably start with an initial track from the discs 108 and evaluate all of the data blocks on that track before moving to the next, adjacent track. Moreover, especially in a high capacity disc drive having multiple discs, it is contemplated that the drive will monitor the data blocks that have been evaluated so that, over a series of successive idle periods, the disc drive will be able to cycle through all of the data blocks on the discs 108 before starting over again with the first data block.

Moreover, as described above the routine of FIG. 8 reallocates data blocks when a certain level of extended read error recovery is performed to recover the data (such as after reaching a selected table count in the table).

The selection of the appropriate point at which reallocation will occur should be determined by balancing the ability to recover the user data under all circumstances, which argues in favor of a relatively earlier reallocation, with the premature reallocation of otherwise marginally good data blocks and the attendant reduction in effective storage capacity, which argues in favor of a relatively later reallocation. However, the ultimate goal is to successfully recover the user's data even if doing so dramatically decreases the overall transfer rate during periods of operation of the drive; hence an important advantage of the present invention over the prior art is that marginal data blocks are detected and reallocated in a proactive and transparent manner.

Although read errors have been identified hereinabove as the primary criteria upon which the reallocation of sectors is based, other types of errors could readily be used in the place of, or in conjunction with, read errors as reallocation criteria. Such other types of errors include, for example, sync errors in the read channel 160 caused by misdetection of the sync words by the sync error detector 178 or position related errors due to defects affecting the servo blocks 202 utilized by the servo control circuit 144.

It is contemplated that in some cases it may be desirable to perform selected ones of the corrective operations of the table of FIG. 6 in a different order, based upon the effectiveness of particular corrective operations in the resolution of the detected data block errors. More particularly, successful corrective operations can be advanced in the table, which may serve to adapt the error recovery process to the particular anomalous conditions encountered by the disc drive 100 which cause the uncorrected errors. However, this reordering should be balanced against a general ordering of the corrective actions from relatively simple to relatively extensive, and the boundary at which the decision is made to reallocate should remain fairly rigid.

Finally, it will be recognized that during early portions of the operational life of the disc drive 100, generally less user data will be stored on the drive as compared to later portions of the operational life of the drive. Accordingly, the present invention will further operate to identify and reallocate damaged data blocks, such as from time to time arise from shipment and handling of drives, before such data blocks are ever accessed by the user.

In summary, the present invention as disclosed above provides a method and apparatus for optimizing the data transfer performance of a disc drive (such as 100) in which, upon detection of an idle condition (such as at block 222), data blocks (such as 204) are sequentially evaluated for uncorrected errors (such as at blocks 234, 236). Each data block having an uncorrected error is reread using a series of corrective operations (such as at block 242) in an effort to resolve the uncorrected error. At such time that a certain level of corrective actions have been applied without successful resolution of the error, the disc drive proceeds to reallocate the selected data block (such as at block 248). For purposes of the appended claims, it will be understood that the term "circuitry" is contemplated as including hardware as well as firmware implementations. Also, as during an initial disc drive formatting operation randomized patterns of data are typically written to the user data fields of the data blocks so that an unaccessed data block will not yet include "user" data, for purposes of the appended claims it will be recognized that the phrase "user data" includes both actual user data that has been provided by a user as well as the initially written randomized patterns of data written during the formatting operation (and not actually provided by the user). That is, "user data" will be understood to mean the pattern of data resident in the associated user data field of the associated data block, regardless of source. It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive in which user data are stored in data blocks arranged on tracks of a rotatable disc, the disc drive comprising:

idle detection circuitry for detecting an idle condition for the disc drive, the idle condition comprising the passage of a selected, uninterrupted amount of time since the most recently performed disc drive operation; and data block reallocation circuitry, responsive to the idle detection circuitry, for evaluating a data block that has yet to be accessed by a user to store data and making the data block unavailable for future use when an error condition is identified for the data block, the data block reallocation circuitry operable during the idle condition.

2. The disc drive of claim 1, wherein the data block reallocation circuitry utilizes a table of error recovery routines, wherein the error recovery routines are performed in a sequence determined by the order in which the error recovery routines appear in the table, and wherein the error condition is determined to be uncorrectable at such time that at least selected ones of the error recovery routines are unsuccessful in correcting the error condition.

3. The disc drive of claim 2, further comprising:

dithering circuitry for performing a dithering operation after the operation of the data block reallocation circuitry has been completed.

4. In a disc drive of the type having a disc and an actuator assembly adjacent the disc, the actuator assembly including a head that is controllably positionable with respect to tracks on the disc and is used to store data in data blocks disposed on the tracks, the disc drive further comprising a read/write channel responsive to the head for transferring the data between the disc and a host computer, a method for optimizing data transfer performance of the disc drive, comprising steps of:

(a) determining that the disc drive has entered an idle mode of operation, the idle mode of operation determined from the passage of a selected, uninterrupted amount of time since the most recently performed disc drive operation; and (b) during the idle mode of operation:

(1) evaluating data blocks yet to be accessed by a user for the presence of one or more uncorrected errors;

(2) applying a series of corrective operations during an error recovery routine in an attempt to resolve the uncorrected error or errors; and (3) making selected data blocks unavailable for future use when the series of corrective operations unsuccessfully corrects the error or errors associated with the selected data blocks.

5. The method of claim 4, wherein step (b)(2) further comprises steps of:

(i) providing a plurality of corrective operations; and (ii) performing the corrective operations in a predetermined sequence.

6. The method of claim 5, wherein the plurality of corrective operations are organized in a table, the table sequentially identifying the plurality of compensation terms in an order corresponding to the predetermined sequence.

7. The method of claim 4, wherein step (b) further comprises steps of:

(4) performing a dithering operation after steps (1) through (3) have been completed.

8. The disc drive of claim 1, wherein the data block reallocation circuitry farther evaluates a second data block that has been accessed by a user to store data and makes the second data block unavailable for future use when an error condition is identified for the data block.

9. The method of claim 4, wherein steps (b)(1) through (b)(3) are repeated for data blocks that have been accessed by the user to store data.

10. The method of claim 4, wherein step (b)(3) comprises steps of:

(i) marking the selected data blocks; and (ii) reallocating the marked, selected data blocks upon initiation of a subsequent write operation.

11. The method of claim 4, wherein step (b) further comprises a step of:

(4) making selected data blocks unavailable for future use when at least a selected one of the series of corrective operations successfully corrects the error or errors associated with the selected data blocks.

* * * * *

UNITED STATES PATENT AND TRADEMARK OFFICE
CERTIFICATE OF CORRECTION

PATENT NO.   : 6,052,804  
DATED        : April 18, 2000  
INVENTOR(S)  : Merle E. Thowe and Mark A. Heath Page 1 of 1

It is certified that error appears in the above-identified patent and that said Letters Patent is hereby corrected as shown below:

Column 2,
Line 44, replace "modem computer systems" with -- modern computer systems --.

Column 3,
Line 12, replace "compared later" replace with -- compared to later --.

Column 9,
Line 23, replace "FIG. 4-1" with -- FIG. 4 --.

Column 11,
Line 17, replace "farther reallocates" with -- further reallocates --.

Column 16,
Line 8, replace "farther evaluates" with -- further evaluates --.

Signed and Sealed this

Seventh Day of May, 2002

Attest:

*Attesting Officer*

JAMES E. ROGAN  
*Director of the United States Patent and Trademark Office*